July 21, 1970 R. L. JAMES 3,521,272

CONTROL NETWORK FOR A DIGITAL COUNTER

Filed Aug. 5, 1966

INVENTOR.
ROBERT L. JAMES
BY Herbert L. Davis
ATTORNEY 3,521,272

CONTROL NETWORK FOR A DIGITAL COUNTER

Robert L. James, Bloomfield, N.J., assignor to The Bendix Corporation, a corporation of Delaware Filed Aug. 5, 1966, Ser. No. 570,643
Int. Cl. H03k 21/30, 13/20
U.S. Cl. 340—347 7 Claims

ABSTRACT OF THE DISCLOSURE

A control network apparatus for controlling digital counters, particularly for controlling the counting direction of the counter, and for inhibiting the counter from counting while the counting direction is changing.

Counters for counting pulses corresponding to the amplitude of an input signal, such as used in a digital integrator-synchronizer of the type disclosed and broadly claimed in the co-pending U.S. application Ser. No. 558,327, filed June 17, 1966 by Robert L. James, and assigned to The Bendix Corporation, assignee of the present invention, are rendered responsive to the polarity of the input signal by count-up or count-down command pulses. In order to prevent erroneous counts from occurring, the counter must be inhibited from counting when the count-up or count-down command pulses are changing.

One object of this invention is to provide novel means for controlling the counter, including means for providing count-up and count-down command pulses in accordance with the polarity of the input signal.

Another object of this invention is to provide novel means for inhibiting the counter when the count-up and count-down command pulses are changing so as to prevent erroneous counts from occurring.

This invention contemplates, in a system including a counter for providing digital outputs corresponding to an input signal, a control network for the counter comprising: means responsive to the input signal for providing an output voltage corresponding thereto; a first circuit connected to the means responsive to the input signal and responsive to the polarity of the output voltage therefrom for providing a first pulse; a second circuit connected to the means responsive to the input signal and responsive to the output voltage therefrom for providing a second pulse; and the counter being connected to the first circuit and to the second circuit and responsive to the first pulse provided by the first circuit for counting in a direction in accordance with the first pulse, and responsive to the second pulse provided by the second circuit so as to be inhibited thereby from counting.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figures 1, 2, 3:
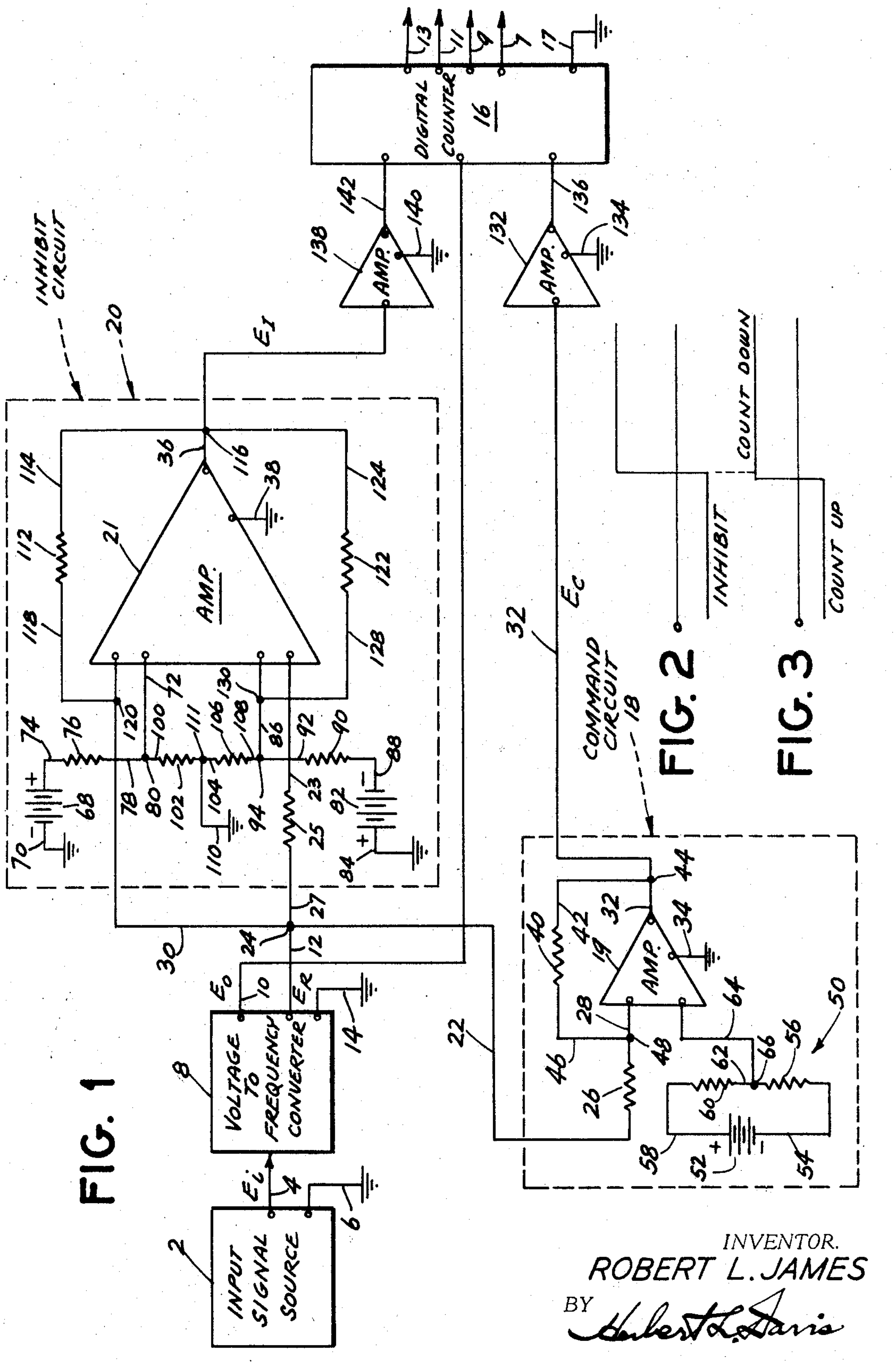
FIG. 1 is an electrical schematic diagram showing the control network of the present invention.
FIG. 2 is a graphical representation of the pulse provided by the inhibit circuit included in the control network of FIG. 1.
FIG. 3 is a graphical representation of the pulse provided by the command circuit included in the control network of FIG. 1.

An input signal source 2 having an output conductor 4 and a grounded output conductor 6 provides at the output conductor 4 a direct current or demodulated alternating current signal $E_I$ such as is used in a flight control system or other servo system. The signal $E_I$ is applied through the output conductor 4 to a voltage to frequency converter 8 having an output conductor 10, an output conductor 12 and a grounded input-output conductor 14. The voltage to frequency converter 8 may be of the type such as that disclosed and broadly claimed in the copending U.S. application Ser. No. 570,666, filed Aug. 5, 1966, by Robert L. James, and assigned to The Bendix Corporation, assignee of the present invention, which provides at the output conductor 10 a pulse $E_o$ having a frequency corresponding to the amplitude of the input signal $E_I$ from the input signal source 2, and provides at the output conductor 12 a ramp voltage $E_R$. The ramp voltage $E_R$ is positive going when the input signal $E_I$ is negative and negative going when the input signal $E_I$ is positive.

The pulse $E_o$ at the output conductor 10 of the voltage to frequency converter 8 is applied through the output conductor 10 to a digital counter 16. The digital counter 16, which may be a type such as that disclosed and broadly claimed in the copending U.S. application Ser. No. 603,631, filed Dec. 21, 1966, by Robert L. James, and assigned to The Bendix Corporation, assignee of the present invention, has a grounded input-output conductor 17 and a plurality of output conductors shown for purposes of example as being four in number and designated by the numerals 7, 9, 11 and 13. The digital counter 16 provides at each of the output conductors 7, 9, 11 and 13 a signal corresponding to a binary bit of the total number of the pulses $E_o$ provided by the voltage to frequency converter 8 at the output conductor 10 thereof.

A command circuit 18 included in the control network of the present invention provides a pulse $E_C$ in a manner which will be hereinafter described for controlling the counting direction of the digital counter 16 so that the digital counter 16 counts up or counts down depending on the polarity of the input signal $E_I$ from the input signal source 2. Since the digital counter 16 cannot distinguish between a change in the command pulse $E_C$ provided by the command circuit 18 and a change in the pulses $E_o$ provided by the voltage to frequency converter 8, it is necessary to inhibit the digital counter 16 from changing the count of the total number of the pulses $E_o$ when the command pulse $E_C$ changes. This is accomplished by an inhibit circuit 20 which is included in the control network of the present invention and which provides an inhibit pulse $E_I$ in a manner which will be hereinafter described.

The ramp voltage $E_R$ provided at the output conductor 12 of the voltage to frequency converter 8 is applied to an amplifier 19 included in the command circuit 18 through the output conductor 12, a conductor 22 joining the output conductor 12 at a point 24, a resistor 26 and an input conductor 28 of the amplifier 19. The amplifier 19 has an output conductor 32 at which the command pulse $E_C$ is provided, and a grounded input-output conductor 34.

The ramp voltage $E_R$ at the output conductor 12 of the voltage to frequency converter 8 is applied to an amplifier 21 included in the inhibit circuit 20 through the dual input conductors 23 and 30 of the amplifier 21. The input conductor 30 of the amplifier 21 joins the output conductor 12 of the voltage to frequency converter 8 at the point 24, and the input conductor 23 of the amplifier 21 is coupled to the output conductor 12 of the voltage to frequency converter 8 through a resistor 25 and a conductor 27 joining the output conductor 12 at the point 24. The amplifier 21 has an output conductor 36 at which the inhibit pulse $E_I$ is provided, and a grounded input-output conductor 38.

A biasing voltage is supplied to the amplifier 19 of the command circuit 18 by a circuit 50 including a suitable source of direct current shown as a battery 52 having a negative terminal connected through a conductor 54 to a resistor 56 and a positive terminal connected through a conductor 58 to a resistor 60. The resistor 60 is coupled to the resistor 56 through a conductor 62. An input conductor 64 of the amplifier 19 is connected to the coupling conductor 62 at a point 66, with the biasing voltage provided by the circuit 50 being applied to the amplifier 19 through the input conductor 64. A resistor 40 is connected in a feedback path of the amplifier 19 through a conductor 42 joining the output conductor 32 of the amplifier 19 at a point 44 and a conductor 46 joining the input conductor 28 of the amplifier 19 at a point 48.

A positive biasing voltage is supplied to the amplifier 21 of the inhibit circuit 20 by a suitable source of direct current shown as a battery 68. The battery 68 has a negative terminal connected to a grounded conductor 70 and a positive terminal connected to an input conductor 72 of the amplifier 21 through a conductor 74, a resistor 76 and a conductor 78 joining the input conductor 72 at a point 80. A negative biasing voltage is supplied to the amplifier 21 of the inhibit circuit 20 by a suitable source of direct current shown as a battery 82. The battery 82 has a positive terminal connected to a grounded conductor 84 and a negative terminal connected to an input conductor 86 of the amplifier 21 through a conductor 88, a resistor 90 and a conductor 92 joining the input conductor 86 of the amplifier 21 at a point 94. The input conductor 72 of the amplifier 21 is connected to the input conductor 86 of the amplifier 21 through a conductor 100 joining the input conductor 72 at the point 80, a resistor 102, a conductor 104, a resistor 106 and a conductor 108 joining the input conductor 86 at the point 94. The conductor 104 is connected to a grounded conductor 110 at a point 111.

A resistor 112 is connected in a positive feedback path of the amplifier 21 through a conductor 114 joining the output conductor 36 of the amplifier 21 at a point 116 and a conductor 118 joining the input conductor 30 of the amplifier 21 at a point 120. A resistor 122 is connected in a negative feedback path of the amplifier 21 through a conductor 124 joining the output conductor 36 of the amplifier 21 at the point 116 and a conductor 128 joining the input conductor 86 of the amplifier 21 at a point 130.

The command pulse $E_C$ provided by the command circuit 18 and having a waveform as shown in the graphical representation of FIG. 3 is applied through the output conductor 32 of the amplifier 19 to an amplifier 132 having a grounded input-output conductor 134, and therefrom through an output conductor 136 of the amplifier 132 to the digital counter 16 for commanding the counter 16 to count-up or count-down. The inhibit pulse $E_I$ provided by the inhibit circuit 20 and having a waveform as shown in the graphical representation of FIG. 2 is applied through the output conductor 36 of the amplifier 21 to an amplifier 138 having a grounded input-output conductor 140 and therefrom through an output conductor 142 of the amplifier 138 to the digital counter 16 for inhibiting the counter 16 from responding to any input pulses when the inhibit pulse $E_I$ is at the inhibit level shown in the graphical representation of FIG. 2.

OPERATION

The command circuit 18 functions as a comparator, with the amplifier 19 thereof comparing the ramp voltage output $E_R$ provided by the voltage to frequency converter 8 and applied to the amplifier 19 through the input conductor 28, to the biasing voltage provided by the circuit 50 and applied to the amplifier 19 through the input conductor 64. When the ramp voltage $E_R$ provided by the voltage to frequency converter 8 is equal to the biasing voltage provided by the circuit 50, the amplifier 19 operates in its linear range. Regenerative action occurs through the resistor 40 in the feedback path of the amplifier 19 and the output pulse $E_C$ of the command circuit 18 switches rapidly from one output level to the other. These output levels are shown in the graphical representation of FIG. 3 and designated thereat as "count-up" and "count-down."

The biasing voltage provided by the circuit 50 and the hysteresis in the feedback path of the amplifier 19 are predetermined so that the level of the pulse $E_C$ provided by the command circuit 18 changes whenever the ramp voltage $E_R$ from the voltage to frequency converter 8 increases in either polarity direction from ground level. For example, when the ramp voltage $E_R$ provided by the voltage to frequency converter 8 is more positive than the biasing voltage provided by the circuit 50, the pulse $E_C$ is at a positive level and designated as "count-down" in the graphical representation of FIG. 3. When the ramp voltage $E_R$ provided by the voltage to frequency converter 8 decreases toward ground level, thereby providing a negative going ramp voltage $E_R$ as a result of a change in polarity of the input signal $E_i$ to the voltage to frequency converter 8 from the input signal source 2, the pulse $E_C$ will remain at the positive level until the ramp voltage $E_R$ has passed through ground level and decreases in the opposite polarity direction to a predetermined level established by the hysteresis in the feedback path of the amplifier 19, with this predetermined level being designated as "count-up" in the graphical representation of FIG. 3.

Since the counter 16 cannot distinguish the command pulse $E_C$ applied to the counter 16 through the output conductor 136 of the amplifier 132 from the pulse $E_o$ applied to the counter 16 through the output conductor 10 of the voltage to frequency converter 8, erroneous outputs could occur at the output conductors 7, 9, 11 and 13 of the counter 16 when the command pulse $E_C$ changes from either the "count-up" or "count-down" level to the other level. To prevent this, the pulse $E_I$ from the inhibit circuit is applied through the output conductor 142 of the amplifier 138 to the digital counter 16. The pulse $E_I$ prevents the counter 16 from responding either to the pulses $E_C$ from the command circuit 18 or the pulse $E_o$ from the voltage to frequency converter 8.

The amplifier 21 in the inhibit circuit 20 is of the dual comparator type and functions in a manner analogous to that of the amplifier 19 to compare the ramp voltage $E_R$ provided by the voltage to frequency converter 8 to the biasing voltages provided by the batteries 68 and 82 so as to provide pulses of positive and negative output levels as shown in the graphical representation of FIG. 2, with the negative output level being the "inhibit" pulse level. The counter 16 is arranged so as not to be inhibited when the pulse $E_I$ provided by the inhibit circuit 20 is at the positive output level but will be inhibited when the pulse $E_I$ is at the negative level. The biasing voltages provided by the batteries 68 and 82, and the hysteresis in the dual feedback paths of the amplifier 21 insure that the pulse $E_I$ is always at a negative level, so as to inhibit the counter 16, whenever the ramp voltage $E_R$ provided by the voltage to frequency converter 8 is close to ground level whereat the command pulses $E_C$ will change from the "count-up" or "count-down" level to the other level, and at a positive level, so as not to inhibit the counter 16, whenever the ramp voltage $E_R$ reaches higher output levels where the pulses $E_o$ are provided by the voltage to frequency converter 8 so as to be counted by the counter 16.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. An electrical system comprising:
means for providing an input signal;
a voltage to frequency converter connected to the input signal means for providing pulses having a frequency corresponding to the amplitude of the input signal, and for providing an output in one sense and in another sense in accordance with the sense of the input signal;
a first circuit connected to the voltage to frequency converter and responsive to the output therefrom in the one sense for providing a first pulse at one predetermined level, and responsive to the output therefrom in the other sense for providing said first pulse at another predetermined level;
a second circuit connected to the voltage to frequency converter and responsive to the output therefrom for providing a second pulse, with said second pulse having a predetermined sense when the first pulse changes from the one predetermined level to the other predetermined level;
a counter connected to the voltage to frequency converter for counting the pulses therefrom in count-up and count-down directions;
the counter being connected to the first circuit and responsive to the first pulse for counting in one of said directions when the first pulse is at the one predetermined level and for counting in the other direction when said first pulse is at the other predetermined level; and
the counter being connected to the second circuit for being inhibited from counting by the second pulse in the predetermined sense.

2. A control network as described by claim 1, wherein the first circuit comprises:
means for providing a biasing voltage; and
a comparator connected to the voltage to frequency converter and connected to the means for providing a biasing voltage for comparing the output of the voltage to frequency converter to the biasing voltage, and for providing the first pulse in accordance with said comparison.

3. A control network as described by claim 2, wherein the comparator comprises:
an amplifier having a first input connected to the voltage to frequency converter, a second input connected to the means for providing a biasing voltage, and an output at which the first pulse is provided; and
a resistor connected to the first input and to the output for providing a feedback path so that the first pulse at the output of the amplifier changes from the one predetermined level to the other predetermined level when the output provided by the voltage to frequency converter is substantially equal to the biasing voltage.

4. A control network as described by claim 3, wherein:
the first pulse is at the one predetermined level when the output from the voltage to frequency converter is increasing in one polarity direction from ground level; and
the first pulse is at the other predetermined level when said output is increasing in the other polarity direction from ground level.

5. A control network as described by claim 1 wherein the second circuit comprises:
means for providing a biasing voltage of the predetermined polarity;
means for providing a biasing voltage of a polarity opposite to the predetermined polarity; and
a comparator connected to the voltage to frequency converter and connected to the first and second biasing voltage means for comparing the output from the converter to the biasing voltage of the polarity opposite to the predetermined polarity, and for providing the second pulse in accordance wtih said comparison.

6. A control network as described by claim 5, wherein the comparator comprises:
an amplifier having a first input connected to the voltage to frequency converter, a second input connected to the voltage to frequency converter, a third input connected to the means for providing the biasing voltage of the predetermined polarity, a fourth input connected to the means for providing the biasing voltage of the polarity opposite to the predetermined polarity, and an output at which the second pulse is provided;
a resistor connected to the first input and connected to the output for providing a feedback path so as to provide the second pulse at the polarity opposite to the predetermined polarity when the output from the voltage to frequency converter is substantially equal to the biasing voltage of the polarity opposite to the predetermined polarity; and
a resistor connected to the second input and connected to the output for providing a feedback path so as to provide the second pulse at the predetermined polarity when the output from the voltage to frequency converter is substantially equal to the biasing voltage of the predetermined polarity.

7. A control network as described in claim 6 wherein: the second pulse is provided at the predetermined polarity when the output from the voltage to frequency converter is substantially at ground level.

References Cited

UNITED STATES PATENTS

| | | | |
|---|---|---|---|
| 2,903,185 | 9/1959 | Myers | 235—183 |
| 3,374,339 | 3/1968 | Webb | 235—92 |

MAYNARD R. WILBUR, Primary Examiner

R. F. GNUSE, Assistant Examiner

U.S. Cl. X.R.

235—92